(12) United States Patent
Twelves, Jr.

(10) Patent No.: US 9,435,292 B2
(45) Date of Patent: Sep. 6, 2016

(54) TURBINE ENGINE WITH THRUST VECTORING EXHAUST NOZZLE

(75) Inventor: Wendell V. Twelves, Jr., Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 1110 days.

(21) Appl. No.: 13/403,662

(22) Filed: Feb. 23, 2012

(65) Prior Publication Data

US 2013/0219858 A1  Aug. 29, 2013

(51) Int. Cl.
*F02K 1/00* (2006.01)

(52) U.S. Cl.
CPC .................... *F02K 1/006* (2013.01)

(58) Field of Classification Search
CPC ........ F02K 1/002; F02K 1/006; F02K 1/008; F02K 1/40; F02K 1/42; F02K 1/625; F02K 1/563; F02K 1/28; F02K 1/32; F02K 1/72; F02K 1/74
USPC .......................................................... 60/229
See application file for complete search history.

(56) References Cited

U.S. PATENT DOCUMENTS

| | | |
|---|---|---|
| 3,943,707 A | 3/1976 | Nash |
| 4,848,664 A | 7/1989 | Thayer |
| 4,978,071 A | 12/1990 | MacLean et al. |
| 5,261,604 A | 11/1993 | Meyer |
| 5,690,280 A | 11/1997 | Holowach et al. |
| 5,694,766 A | 12/1997 | Smereczniak et al. |
| 6,679,048 B1 * | 1/2004 | Lee et al. ............... 60/204 |
| 6,883,543 B2 | 4/2005 | Tew et al. |
| 7,748,211 B2 | 7/2010 | Norris et al. |
| 8,020,367 B2 | 9/2011 | Toffan et al. |
| 2006/0150612 A1 | 7/2006 | Anderson et al. |
| 2006/0242942 A1 * | 11/2006 | Johnson ................. 60/228 |
| 2007/0144141 A1 | 6/2007 | Roberge et al. |
| 2009/0142184 A1 | 6/2009 | Roberge |
| 2009/0211224 A1 * | 8/2009 | Lundladh et al. ........ 60/229 |
| 2011/0168809 A1 | 7/2011 | Smith, III et al. |

FOREIGN PATENT DOCUMENTS

GB    2282353    4/1995

OTHER PUBLICATIONS

International search report for PCT/US2013/027360 dated May 30, 2013.

* cited by examiner

*Primary Examiner* — Andrew Nguyen
(74) *Attorney, Agent, or Firm* — O'Shea Getz P.C.

(57) ABSTRACT

A turbine engine exhaust nozzle includes a core gas duct, a nozzle duct, and a thrust vectoring duct system having a duct valve, a first vectoring duct and a second vectoring duct. The nozzle duct directs a first portion of core gas from the core gas duct through a nozzle duct outlet along a centerline. The duct valve connects the core gas duct to the first vectoring duct during a first mode of operation, and connects the core gas duct to the second vectoring duct during a second mode of operation. The first vectoring duct directs a second portion of core gas from the core gas duct through a first vectoring duct outlet along a first trajectory. The second vectoring duct directs a third portion of core gas from the core gas duct through a second vectoring duct outlet along a second trajectory that is angularly offset to the first trajectory.

20 Claims, 3 Drawing Sheets

TURBINE ENGINE WITH THRUST VECTORING EXHAUST NOZZLE

BACKGROUND OF THE INVENTION

1. Technical Field

The present invention relates generally to a turbine engine and, in particular, to a turbine engine with a thrust vectoring exhaust nozzle.

2. Background Information

A gas turbine engine may include an engine core housed within an engine case. The engine case may extend from an engine inlet to a thrust vectoring exhaust nozzle. A typical thrust vectoring exhaust nozzle may include a plurality of moving convergent and divergent flaps. Such convergent and divergent flaps typically have complex geometries, and are arranged outside of the engine case.

SUMMARY OF THE DISCLOSURE

According to a first aspect of the invention, a turbine engine exhaust nozzle includes a core gas duct, a nozzle duct, and a thrust vectoring duct system having a duct valve, a first vectoring duct and a second vectoring duct. The nozzle duct directs a first portion of core gas from the core gas duct through a nozzle duct outlet along a centerline. The duct valve connects the core gas duct to the first vectoring duct during a first mode of operation, and connects the core gas duct to the second vectoring duct during a second mode of operation. The first vectoring duct directs a second portion of core gas from the core gas duct through a first vectoring duct outlet along a first trajectory. The second vectoring duct directs a third portion of core gas from the core gas duct through a second vectoring duct outlet along a second trajectory that is angularly offset to the first trajectory.

According to a second aspect of the invention, a gas turbine engine includes an engine core and a nozzle. The engine core includes a compressor section, a combustor section and a turbine section. The nozzle receives core gas from the engine core through a core gas duct, and includes a nozzle duct and a thrust vectoring duct system. The nozzle duct directs a first portion of core gas from the core gas duct through a nozzle duct outlet along a centerline. The thrust vectoring duct system includes a duct valve that connects the core gas duct to a first vectoring duct during a first mode of operation, and connects the core gas duct to a second vectoring duct during a second mode of operation. The first vectoring duct directs a second portion of core gas from the core gas duct through a first vectoring duct outlet along a first trajectory. The second vectoring duct directs a third portion of core gas from the core gas duct through a second vectoring duct outlet along a second trajectory that is angularly offset to the first trajectory.

The foregoing features and the operation of the invention will become more apparent in light of the following description and the accompanying drawings.

DETAILED DESCRIPTION OF THE INVENTION

Figure 1:
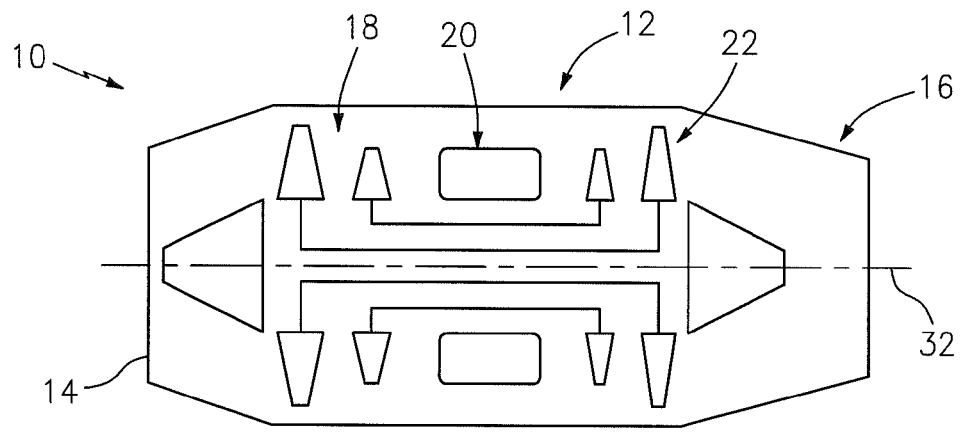
FIG. 1 is a block diagram illustration of a gas turbine engine.

FIG. 1 is a block diagram illustration of a gas turbine engine 10. The turbine engine 10 includes a turbine engine core 12 arranged longitudinally (e.g., axially) between a turbine engine inlet 14 and a (e.g., fixed) thrust vectoring exhaust nozzle 16. The engine core 12 includes a compressor section 18, a combustor section 20 and a turbine section 22.

Figure 2:
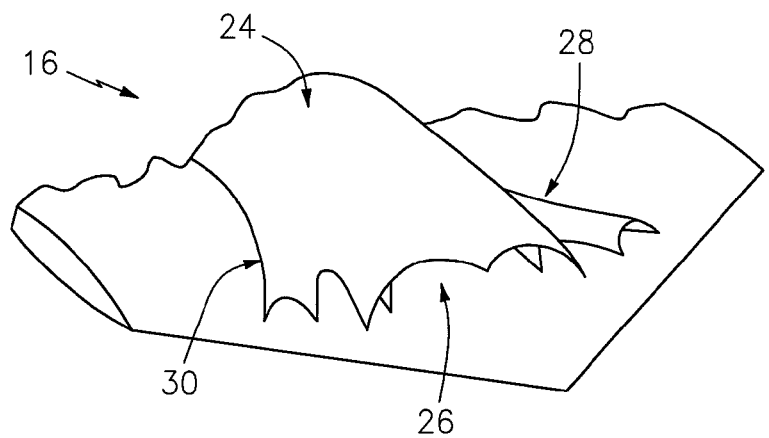
FIG. 2 is a perspective illustration of a thrust vectoring exhaust nozzle arranged with a tail portion of an aircraft airfoil.
Figure 3:
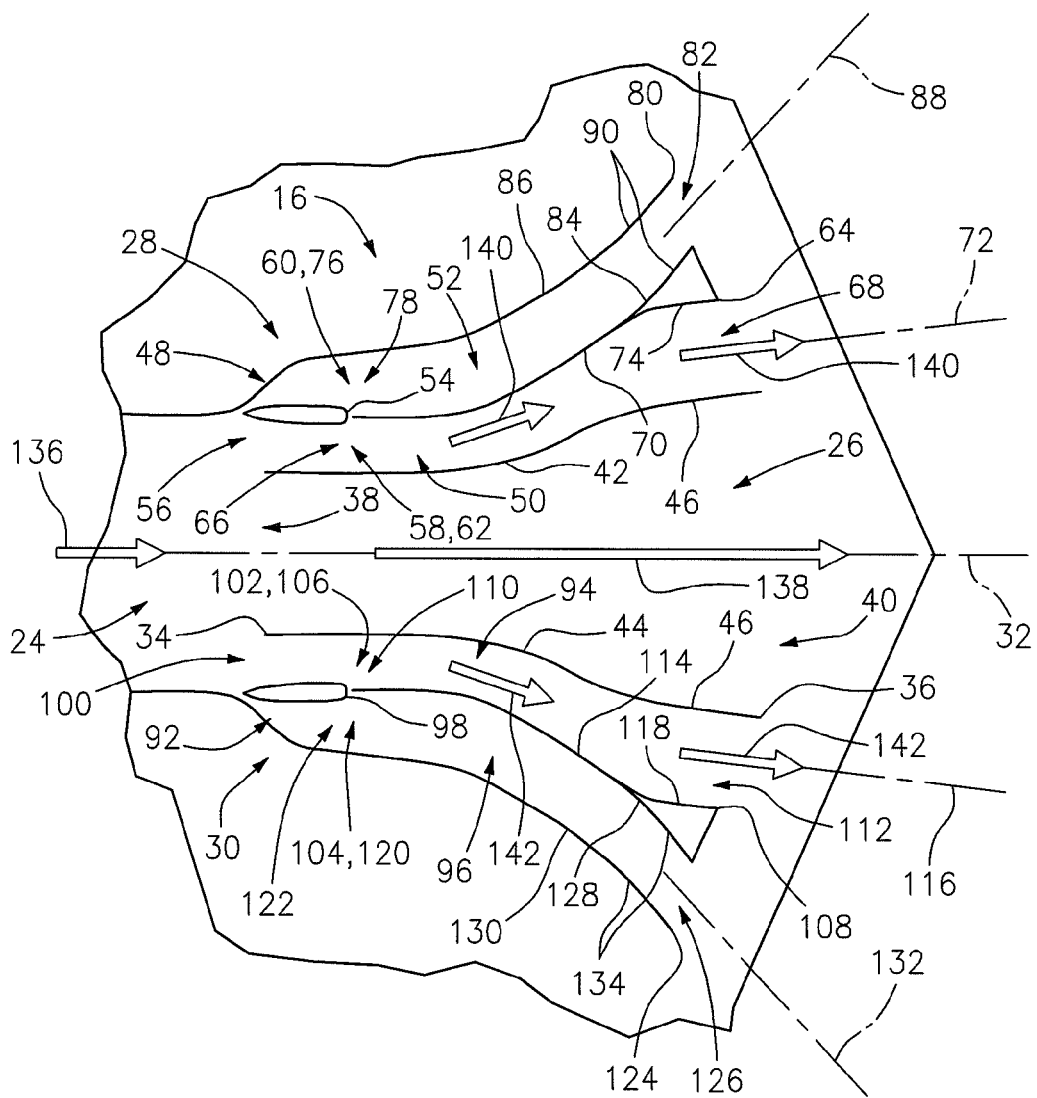
FIG. 3 is a sectional illustration of the exhaust nozzle illustrated in FIG. 2 during a first mode of operation.

FIG. 2 is a perspective illustration of the exhaust nozzle 16 arranged with, for example, a tail portion of an airfoil of an (e.g., flying wing) aircraft. FIG. 3 is a sectional illustration of the exhaust nozzle 16. Referring to FIGS. 2 and 3, the exhaust nozzle 16 includes a core gas duct 24, a central nozzle duct 26, and one or more thrust vectoring duct systems (e.g., 28 and 30). Referring to FIG. 3, the nozzle duct 26 extends along a longitudinal centerline 32 between a nozzle duct inlet 34 and a nozzle duct outlet 36, and may laterally (e.g., radially) diverge towards the nozzle duct outlet 36. The nozzle duct inlet 34, for example, may have a first flow area 38 and the nozzle duct outlet 36 may have a second flow area 40 that is greater than the first flow area 38. The nozzle duct 26 includes one or more nozzle duct walls 42 and 44 that are geometrically configured to direct core gas through the nozzle duct outlet 36 along the centerline 32. Each nozzle duct wall 42, 44, for example, may include a nozzle duct wall end segment 46 that extends to the nozzle duct outlet 36 substantially parallel to the centerline 32; e.g., less than about five to ten degrees angularly offset from the centerline 32.

The first thrust vectoring system 28 may include a first (e.g., a three-way) duct valve 48, a first (e.g., longitudinal) vectoring duct 50, and a second (e.g., lateral) vectoring duct 52. The first duct valve 48 may include a valve plate 54, duct valve inlet 56, a first duct valve outlet 58, and a second duct valve outlet 60. The valve plate 54 may be pivotally arranged between the first duct valve outlet 58 and second duct valve outlet 60.

The first vectoring duct 50 extends between a first vectoring duct inlet 62 and a first vectoring duct outlet 64, and may (e.g., laterally) diverge towards the first vectoring duct outlet 64. The first vectoring duct inlet 62, for example, may have a third flow area 66, and the first vectoring duct outlet 64 may have a fourth flow area 68 that is greater than the third flow area 66. In addition, the third flow area 66 may be sized less than the first flow area 38. The first vectoring duct 50 includes one or more vectoring duct walls such as, for example, the nozzle duct wall 42 and a first vectoring duct wall 70, which are geometrically configured to direct core gas through the first vectoring duct outlet 64 along a first trajectory 72. The first trajectory 72 may be substantially parallel to the centerline 32; e.g., less than about five to ten degrees angularly offset from the centerline 32. The first vectoring duct wall 70, for example, may include a first vectoring duct wall end segment 74 that extends to the first vectoring duct outlet 64 substantially parallel to the centerline 32.

The second vectoring duct 52 extends between a second vectoring duct inlet 76 having a fifth flow area 78 and a second vectoring duct outlet 80 having a sixth flow area 82. The fifth flow area 78 may be substantially equal to the sixth flow area 82 and/or third flow area 66. The second vectoring duct 52 includes one or more vectoring duct walls such as, for example, the first vectoring duct wall 70 and one or more second vectoring duct walls 84 and 86. The second vectoring duct walls 84 and 86 are geometrically configured to direct core gas through the second vectoring duct outlet 80 along a second trajectory 88. The second trajectory 88 is angularly offset from the first trajectory 72 (and the centerline 32) by an offset angle between about twenty to ninety degrees (e.g., about thirty degrees). Each of the second vectoring duct walls 84 and 86, for example, may include a second vectoring duct wall end segment 90 that extends to the second vectoring duct outlet 80 and is angularly offset from the centerline 32.

The second thrust vectoring system 30 may include a second (e.g., three-way) duct valve 92, a first (e.g., longitudinal) vectoring duct 94, and a second (e.g., lateral) vectoring duct 96. The second duct valve 92 may include a valve plate 98, duct valve inlet 100, a first duct valve outlet 102, and a second duct valve outlet 104. The valve plate 98 may be pivotally arranged between the first duct valve outlet 102 and second duct valve outlet 104.

The first vectoring duct 94 extends between a first vectoring duct inlet 106 and a first vectoring duct outlet 108, and may (e.g., laterally) diverge towards the first vectoring duct outlet 108. The first vectoring duct inlet 106, for example, may have a seventh flow area 110, and the first vectoring duct outlet 108 may have an eighth flow area 112 that is greater than the seventh flow area 110. In addition, the seventh flow area 110 may be substantially equal to the third flow area 66. The first vectoring duct 94 includes one or more vectoring duct walls such as, for example, the nozzle duct wall 44 and a first vectoring duct wall 114, which are geometrically configured to direct core gas through the first vectoring duct outlet 108 along a third trajectory 116. The third trajectory 116 may be substantially parallel to the centerline 32; e.g., less than about five to ten degrees angularly offset from the centerline 32. The first vectoring duct wall 114, for example, may include a first vectoring duct wall end segment 118 that extends to the first vectoring duct outlet 108 substantially parallel to the centerline 32.

The second vectoring duct 96 extends between a second vectoring duct inlet 120 having a ninth flow area 122 and a second vectoring duct outlet 124 having a tenth flow area 126. The ninth flow area 122 may be substantially equal to the tenth flow area 126 and/or seventh flow area 110. The second vectoring duct 96 includes one or more vectoring duct walls such as, for example, the first vectoring duct wall 114 and one or more second vectoring duct walls 128 and 130. The second vectoring duct walls 128 and 130 are geometrically configured to direct core gas through the second vectoring duct outlet 124 along a fourth trajectory 132. The fourth trajectory 132 is angularly offset from the third trajectory 116 (and the centerline 32) by an offset angle between about twenty to ninety degrees (e.g., about thirty degrees). Each of the second vectoring duct walls 128 and 130, for example, may include a second vectoring duct wall end segment 134 that extends to the second vectoring duct outlet 124 and is angularly offset from the centerline 32.

The core gas duct 24 is connected to the nozzle duct inlet 34 and each duct valve inlet 56 and 100. The first duct valve outlets 58 and 102 are respectively connected to the first vectoring duct inlets 62 and 106. The second duct valve outlets 60 and 104 are respectively connected to the second vectoring duct inlets 76 and 120. The nozzle duct 26 is arranged (e.g., laterally) between the first thrust vectoring system 28 and the second thrust vectoring system 30. Each first vectoring duct 50 and 94 is arranged (e.g., laterally) between the nozzle duct 26 and the respective second vectoring duct 52 and 96.

During engine operation, the exhaust nozzle 16 receives core gas 136 from the engine core 12 (see FIG. 1) through the core gas duct 24. The nozzle duct 26 directs a portion of core gas 138 from the core gas duct 24 through the nozzle duct outlet 36 along the centerline 32.

Referring still to FIG. 3, in a first (e.g., non-thrust vectoring) mode of operation, the first duct valve 48 and the second duct valve 92 may be actuated to connect the core gas duct 24 to the first vectoring ducts 50 and 94 and, for example, disconnect the core gas duct 24 from the second vectoring ducts 52 and 96. The valve plates 54 and 98, for example, may be pivoted to open the first duct valve outlets 58 and 102 and close the respective second duct valve outlets 60 and 104. The first vectoring duct 50 directs a portion of core gas 140 from the core gas duct 24 through the first vectoring duct outlet 64 along the first trajectory 72. The first vectoring duct 94 directs a portion of core gas 142 (e.g., substantially equal to the portion of core gas 140) from the core gas duct 24 through the first vectoring duct outlet 108 along the third trajectory 116. In this manner, the exhaust nozzle 16 exhausts core gas from the turbine engine 10 to provide substantially longitudinal thrust along the centerline 32.

Figure 4:
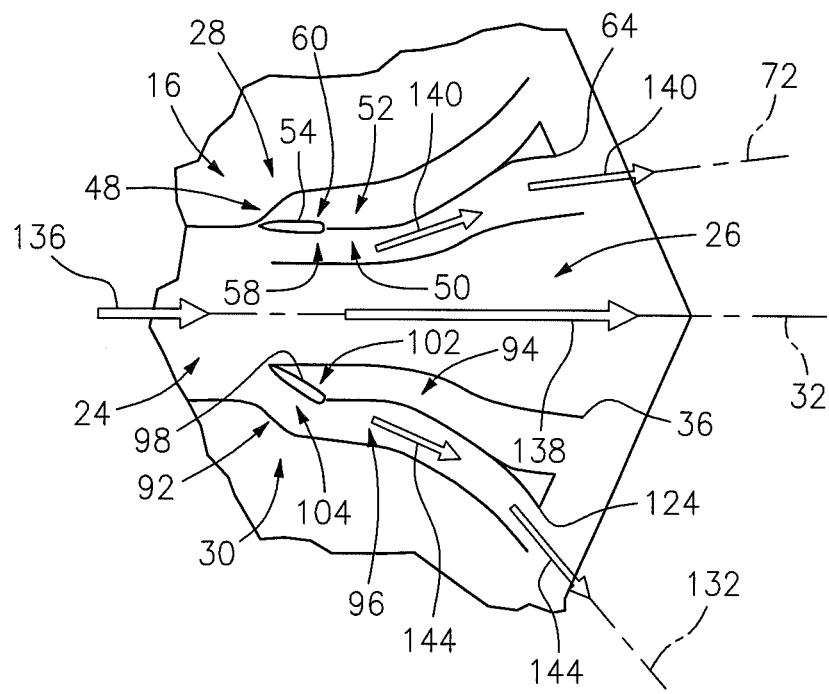
FIG. 4 is a sectional illustration of the exhaust nozzle illustrated in FIG. 2 during a second mode of operation.

Referring to FIG. 4, in a second (e.g., thrust vectoring) mode of operation, the first duct valve 48 may be actuated to connect the core gas duct 24 to the first vectoring duct 50 and, for example, disconnect the core gas duct 24 from the second vectoring duct 52. The valve plate 54, for example, may be pivoted to open the first duct valve outlet 58 and close the second duct valve outlet 60. The second duct valve 92 may be actuated to connect the core gas duct 24 to the second vectoring duct 96 and, for example, disconnect the core gas duct 24 from the first vectoring duct 94. The valve plate 98, for example, may be pivoted to open the second duct valve outlet 104 and close the first duct valve outlet 102. The first vectoring duct 50 directs the portion of core gas 140 from the core gas duct 24 through the first vectoring duct outlet 64 along the first trajectory 72. The second vectoring duct 96 directs a portion of core gas 144 (e.g., substantially equal to the portion of core gas 140) from the core gas duct 24 through the second vectoring duct outlet 124 along the fourth trajectory 132. In this manner, the exhaust nozzle 16 exhausts core gas from the turbine engine 10 to provide both longitudinal and lateral thrust. Depending upon the configuration of the respective thrust vectoring system, the lateral thrust may be utilized to alter aircraft yaw and/or pitch.

Figure 5:
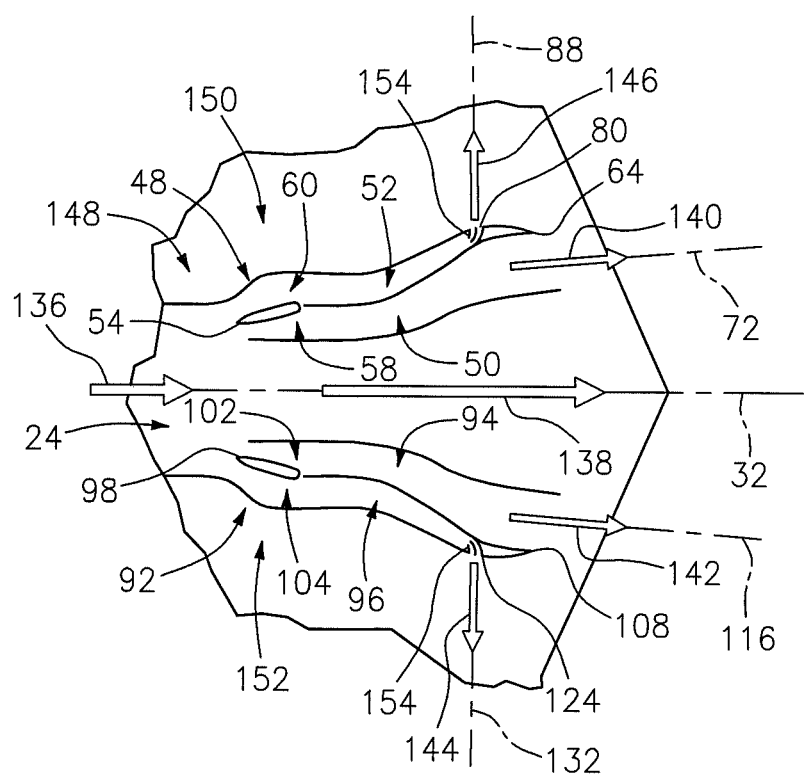
FIG. 5 is a sectional illustration of another thrust vectoring exhaust nozzle during a third mode of operation.

Referring to FIG. 5, in a third (e.g., decelerating) mode of operation, one or more of the duct valves 48 and 92 may be actuated to connect the core gas duct 24 to the first vectoring ducts 50 and 94 and the second vectoring ducts 52 and 96. The valve plates 54 and 98, for example, may be respectively pivoted to partially open both the first duct valve outlets 58 and 102 and the second duct valve outlets 60 and 104. The first vectoring ducts 50 and 94 respectively direct the portions of core gas 140 and 142 from the core gas duct 24 through the first vectoring duct outlets 64 and 108 along the first and third trajectories 72 and 116. The second vectoring ducts 52 and 96 respectively direct the portions of core gas 146 and 144 from the core gas duct 24 through the second vectoring duct outlets 80 and 124 along the second and fourth trajectories 88 and 132. In this manner, the exhaust nozzle 16 may be utilized to relatively quickly reduce longitudinal engine thrust without, for example, altering aircraft yaw and pitch. Alternatively, the valve plates 54 and 98 may be pivoted to close both first duct valve outlets 58 and 102 to further reduce longitudinal engine thrust.

Figure 6:
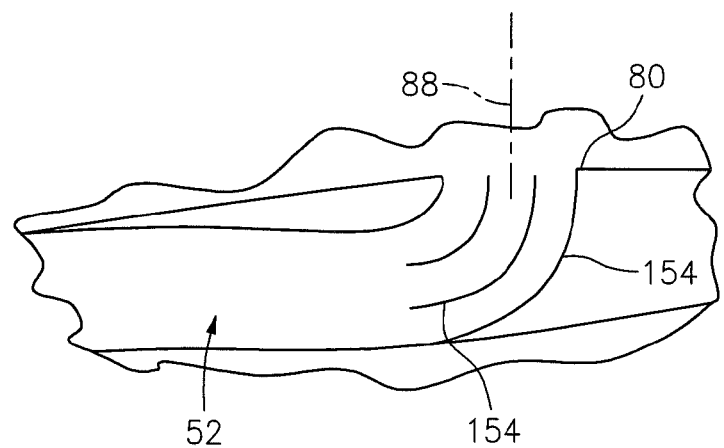
FIG. 6 is an enlarged sectional illustration of a portion of a vectoring duct included in the exhaust nozzle illustrated in FIG. 5.

Referring still to FIG. 5, another thrust vectoring exhaust nozzle 148 is illustrated having one or more thrust vectoring duct systems 150 and 152. In contrast to the thrust vectoring duct systems 28 and 30 in FIGS. 3 and 4, the each thrust vectoring duct system 150 and 152 also includes one or more flow turning vanes 154. Referring to FIG. 6, the vanes 154 may be arranged in each second vectoring duct (e.g., 52) at, for example, the second vectoring duct outlet (e.g., 80). The vanes 154 in the second vectoring duct 52, for example, may be geometrically configured to direct core gas through the respective second vectoring duct outlet 80 along the second trajectory 88.

While various embodiments of the present invention have been disclosed, it will be apparent to those of ordinary skill in the art that many more embodiments and implementations are possible within the scope of the invention. One or more of the duct valves, for example, may include a first (e.g., two way) duct valve arranged with the respective first vectoring duct and a second (two way) duct valve arranged with the respective second vectoring duct. In another example, the thrust vectoring nozzle may be utilized in various different turbine engine and aircraft configurations other than the ones illustrated in the drawings. Accordingly, the present invention is not to be restricted except in light of the attached claims and their equivalents.

What is claimed is:

1. A turbine engine exhaust nozzle, comprising:
    a core gas duct;
    a nozzle duct extending along a longitudinal centerline to a nozzle duct outlet, wherein the nozzle duct directs a first portion of core gas from the core gas duct through the nozzle duct outlet along the centerline during a first mode of operation and a second mode of operation; and
    a thrust vectoring duct system comprising a duct valve that connects the core gas duct to a first vectoring duct during the first mode of operation, connects the core gas duct to a second vectoring duct during the second mode of operation, and disconnects the core gas duct from the first vectoring duct during the second mode of operation;
    wherein the first vectoring duct comprises a first vectoring duct outlet, and directs a second portion of core gas from the core gas duct through the first vectoring duct outlet along a first trajectory;
    wherein the second vectoring duct comprises a second vectoring duct outlet, and directs a third portion of core gas from the core gas duct through the second vectoring duct outlet along a second trajectory that is angularly offset to the first trajectory and diverges laterally away from the centerline; and
    wherein the first vectoring duct is laterally between the nozzle duct and the second vectoring duct.

2. The nozzle of claim 1, wherein the first trajectory is substantially parallel to the centerline.

3. The nozzle of claim 1, wherein the second trajectory is substantially perpendicular to the centerline.

4. The nozzle of claim 1, wherein the first vectoring duct further comprises a first vectoring duct inlet connected to the duct valve, the second vectoring duct further comprises a second vectoring duct inlet connected to the duct valve, and a flow area of the first vectoring duct inlet is substantially equal to a flow area of the second vectoring duct inlet.

5. The nozzle of claim 1, wherein the second portion of core gas directed through the first vectoring duct during the first mode of operation is substantially equal to the third portion of core gas directed through the second vectoring duct during the second mode of operation.

6. The nozzle of claim 1, wherein the duct valve further disconnects the core gas duct from the second vectoring duct during the first mode of operation.

7. The nozzle of claim 1, wherein the duct valve further connects the core gas duct to the second vectoring duct during the first mode of operation.

8. The nozzle of claim 1, wherein the second vectoring duct further comprises one of more vanes arranged at the second vectoring duct outlet and that direct the third portion of core gas along the second trajectory.

9. The nozzle of claim 1, further comprising a second thrust vectoring duct system comprising a second duct valve that connects the core gas duct to a third vectoring duct during the first mode of operation, and connects the core gas duct to a fourth vectoring duct during a third mode of operation, wherein the nozzle duct is arranged laterally between the thrust vectoring system and the second thrust vectoring system.

10. The nozzle of claim 9, wherein the third vectoring duct comprises a third vectoring duct outlet, and directs a fourth portion of core gas from the core gas duct through the third vectoring duct outlet along a third trajectory, and wherein the fourth vectoring duct comprises a fourth vectoring duct outlet, and directs a fifth portion of core gas from the core gas duct through the fourth vectoring duct outlet along a fourth trajectory that is angularly offset to the third trajectory.

11. A gas turbine engine, comprising:
    an engine core comprising a compressor section, a combustor section and a turbine section; and
    a nozzle that receives core gas from the engine core through a core gas duct, the nozzle comprising
        a nozzle duct extending along and laterally centered on a longitudinal centerline to a nozzle duct outlet, wherein the nozzle duct directs a first portion of core gas from the core gas duct through the nozzle duct outlet along the centerline during a first mode of operation and a second mode of operation; and
        a thrust vectoring duct system comprising a duct valve that connects the core gas duct to a first vectoring duct during the first mode of operation, connects the core gas duct to a second vectoring duct during the second mode of operation, and disconnects the core gas duct from the first vectoring duct during the second mode of operation;
        wherein the first vectoring duct comprises a first vectoring duct outlet, and directs a second portion of core gas from the core gas duct through the first vectoring duct outlet along a first trajectory;
        wherein the second vectoring duct comprises a second vectoring duct outlet, and directs a third portion of core gas from the core gas duct through the second vectoring duct outlet along a second trajectory that is angularly offset to the first trajectory and diverges laterally away from the centerline; and
        wherein the first vectoring duct outlet is laterally between the nozzle duct outlet and the second vectoring duct outlet.

12. The engine of claim 11, wherein the first trajectory is substantially parallel to the centerline.

13. The engine of claim 11, wherein the second trajectory is substantially perpendicular to the centerline.

14. The engine of claim 11, wherein the first vectoring duct further comprises a first vectoring duct inlet connected to the duct valve, the second vectoring duct further comprises a second vectoring duct inlet connected to the duct valve, and a flow area of the first vectoring duct inlet is substantially equal to a flow area of the second vectoring duct inlet.

15. The engine of claim 11, wherein the second portion of core gas directed through the first vectoring duct during the first mode of operation is substantially equal to the third portion of core gas directed through the second vectoring duct during the second mode of operation.

16. The engine of claim 11, wherein the duct valve further disconnects the core gas duct from the second vectoring duct during the first mode of operation.

17. The engine of claim 11, wherein the duct valve further connects the core gas duct to the second vectoring duct during the first mode of operation.

18. The engine of claim 11, wherein the second vectoring duct further comprises one of more vanes arranged at the second vectoring duct outlet and that direct the third portion of core gas along the second trajectory.

19. The engine of claim 11, further comprising a second thrust vectoring duct system comprising a second duct valve that connects the core gas duct to a third vectoring duct during the first mode of operation, and connects the core gas duct to a fourth vectoring duct during a third mode of operation, wherein the nozzle duct is arranged laterally between the thrust vectoring system and the second thrust vectoring system, wherein the third vectoring duct comprising a third vectoring duct outlet, and directs a fourth portions of core gas from the core gas duct through the third vectoring duct outlet along a third trajectory, and wherein the fourth vectoring duct comprises a fourth vectoring duct outlet, and directs a fifth portion of core gas from the core gas duct through the fourth vectoring duct outlet along a fourth trajectory that is angularly offset to the third trajectory.

20. A turbine engine exhaust nozzle, comprising:
a core gas duct extending along a centerline;
a nozzle duct fluidly coupled with the core gas during a first mode, a second mode and a third mode, wherein the nozzle duct is configured to exhaust core gas received from the core gas duct along a first trajectory which is substantially parallel with the centerline;
a plurality of vectoring ducts including a first vectoring duct and a second vectoring duct, wherein the first vectoring duct is arranged laterally between the nozzle duct and the second vectoring duct, wherein the first vectoring duct is configured to exhaust core gas received from the core gas duct along a second trajectory, and wherein the second vectoring duct is configured to exhaust core gas received from the core gas duct along a third trajectory which is angularly offset from the first trajectory and the second trajectory and diverges laterally away from the centerline; and
a thrust vectoring duct system configured to
fluidly couple the core gas duct with the first vectoring duct and the second vectoring duct during the first mode;
fluidly couple the core gas duct with the first vectoring duct and fluidly decouple the core gas duct from the second vectoring duct during the second mode; and
fluidly couple the core gas duct with the second vectoring duct and fluidly decouple the core gas duct from the first vectoring duct during the third mode.

* * * * *

UNITED STATES PATENT AND TRADEMARK OFFICE
CERTIFICATE OF CORRECTION

PATENT NO. : 9,435,292 B2
APPLICATION NO. : 13/403662
DATED : September 6, 2016
INVENTOR(S) : Wendell V. Twelves, Jr.

Page 1 of 1

It is certified that error appears in the above-identified patent and that said Letters Patent is hereby corrected as shown below:

In the Claims

Column 7, line 34-35, please delete "comprising" and insert --comprises--

Column 7, line 35, please delete "duet" and insert --duct--

Column 7, line 35, please delete "portions" and insert --portion--

Column 8, line 4, please delete "duet" and insert --duct--

Signed and Sealed this
Twenty-fifth Day of October, 2016

Michelle K. Lee
*Director of the United States Patent and Trademark Office*